United States Patent

[11] 3,633,717

| [72] | Inventors | Virgil H. Stair<br>14826 Enadi Way, Van Nuys, Calif. 91405;<br>James L. Glover, 8070 Langdon Avenue,<br>Van Nuys, Calif. 91406 |
|---|---|---|
| [21] | Appl. No. | 28,766 |
| [22] | Filed | Apr. 15, 1970 |
| [45] | Patented | Jan. 11, 1972 |

[54] TRANSMISSION IDLER AND CLUTCH
15 Claims, 4 Drawing Figs.

[52] U.S. Cl................................................. 192/96,
192/70.27, 192/110 B
[51] Int. Cl................................................. F16d 19/00
[50] Field of Search........................................ 192/96, 97,
115, 70.27, 110 B

[56] References Cited
UNITED STATES PATENTS

| 1,985,422 | 12/1934 | Pearman ..................... | 192/89 A |
| 2,379,901 | 7/1945 | Hare............................ | 192/70.27 |

FOREIGN PATENTS

| 170,729 | 11/1923 | Great Britain................ | 192/96 |
| 701,332 | 3/1931 | France ......................... | 192/89 A |
| 994,666 | 10/1951 | France ......................... | 192/89 A |

*Primary Examiner*—Mark M. Newman
*Assistant Examiner*—Randall Heald
*Attorney*—William H. Maxwell

ABSTRACT: A transmission idler and clutch comprising separable drive elements concentrically journaled on a common bearing body that is fixed on a support, wherein one of said drive elements carries opposed plates yieldingly urged into pressured engagement onto the other of said drive elements embraced therebetween, and wherein clutch control means reacts on the center axis of the bearing body to release the opposed plates and thereby separate the drive elements.

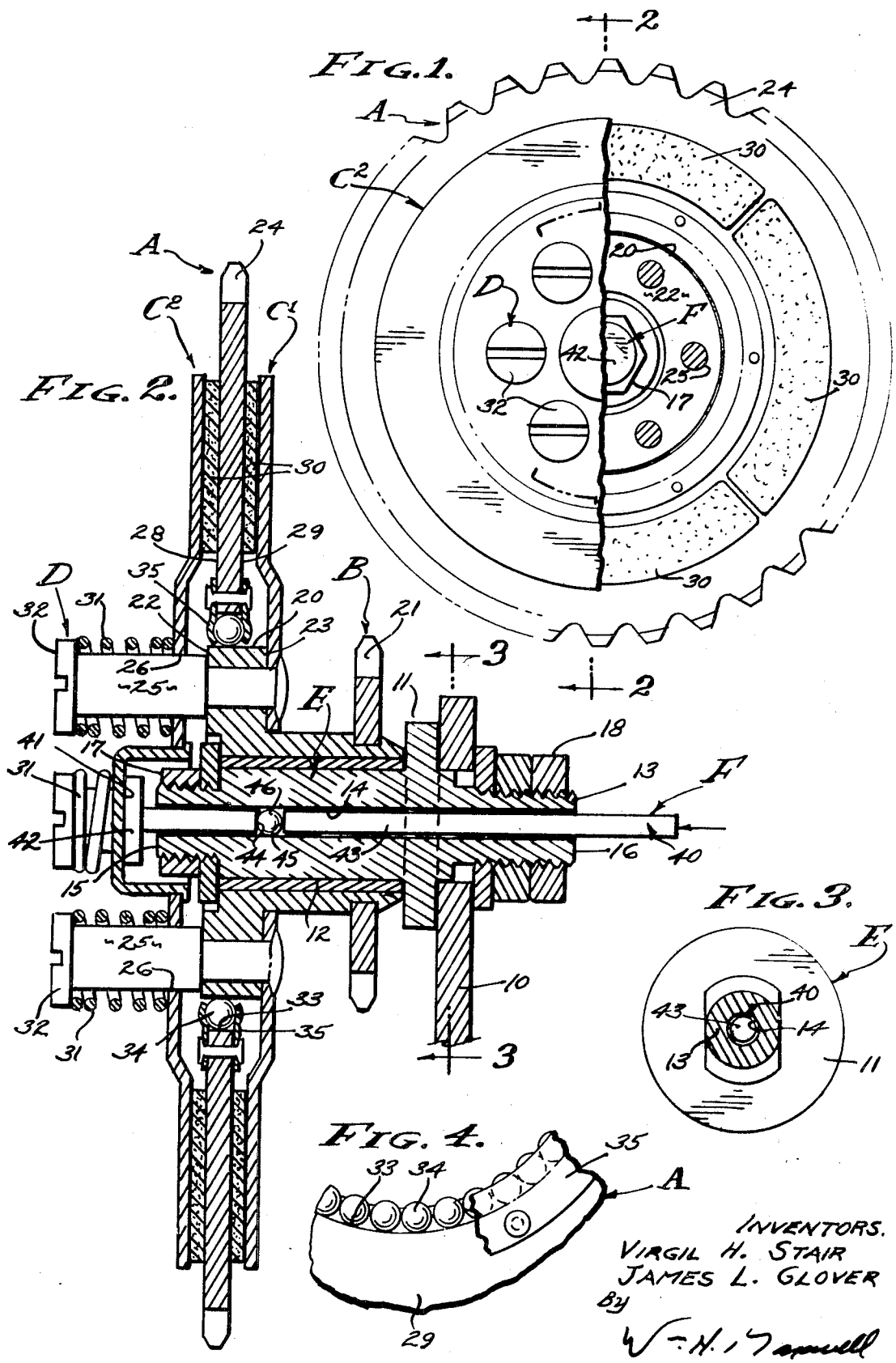

3,633,717

TRANSMISSION IDLER AND CLUTCH

The transmission of power between rotating elements often requires temporary disengagement, for example in the transmission of torque from an engine to the wheels of a vehicle. There are of course many such applications, some of which are involved and include changeable speeds and divisible application or distribution of power. In any case, there are times when it is desirable if not required to separate the power source from the power use, and it is to this end that clutches are employed in drive trains between a prime mover and the use to which torque production is applied. A wide field of use is the transmission of torque as by belts, or chains or gears; externally of the engine or motor supplying the power. Difficulty lies in the fact that both the drive and driven shafts are "live" and which complicates the installation of a controllable clutch. In other words, complication and expense is involved in mounting a clutch on an engine or other equipment which is not designed especially therefor; and as a consequence gearboxes and transmission devices are usually installed intermediate the prime mover drive element and the driven element of whatever equipment is involved. And therefore, it is an object of this invention to provide at this intermediate location a transmission-clutch combination which is selectively controllable to releasably transmit torque.

Another object of this invention is to provide a transmission-clutch combination of the type hereinabove referred to wherein the relatively rotatable drive elements are journaled on antifriction bearings. With the present invention, the concentrically related drive elements are journaled one upon the other and in addition to being separable in the drive sense they are also physically separable for servicing and facility of repair, there being retainers incorporated therein for maintaining integrity of the antifriction bearings normally operating between the two drive elements.

It is still another object of this invention to provide a transmission-clutch combination of the type hereinabove referred to wherein the clutch control means is operable through an antifriction actuator that minimizes torque loss and which is completely disengaged during normal operation of the engaged clutch.

The various objects and features of this invention will be fully understood from the following detailed description of the typical preferred form and application thereof, throughout which description reference is made to the accompanying drawings, in which:

FIG. 1 is an end elevation of the transmission idler and clutch, with a portion broken away so as to expose the drive face and/or lining of the drive element.

FIG. 2 is an enlarged sectional view taken as indicated by line 2—2 on FIG. 1.

FIG. 3 is a sectional view taken as indicated by line 3—3 on FIG. 2, and

FIG. 4 is a fragmentary view of a portion of the drive element, illustrating the retainment thereon of the antifriction bearings.

Referring now to the drawings, the transmission idler and clutch as it is herein disclosed is intended for use as an intermediate unit between a prime mover and a driven apparatus, neither of which is shown. Primarily, it is the idler concept or like application which is utilized, although it is to be understood that either one of the drive elements hereinafter described can be carried directly by the prime mover drive shaft or alternately by the driven apparatus shaft, or the bearing body hereinafter described can be carried directly by a "live" drive shaft or driven shaft, all as circumstances require.

The inventive combination involves, generally, two drive elements and what will be referred to as a drive element A and a driven element B, a pair of opposed clutch plates $C^1$ and $C^2$ carried by the second mentioned driven element B, pressure-exerting means D biasing the plates $C^1$ and $C^2$ onto the drive element A embraced therebetween, a bearing body E, and a control means F. The drive elements A and B are characterized by whatever type of transmission is employed, such as belts, chains or gears and in this instance the elements are sprockets adapted to operate with chains. The clutch plates $C^1$ and $C^2$ are of the disc type that engage the drive element A through intermediate lining. It is preferred that the lining be carried by opposite sides of the drive element A so as to frictionally engage the plates $C^1$ and $C^2$, whereby the said plates driveably engage with the drive element A. The pressure means D is revolvable with the driven element B to carry the plates $C^1$ and $C^2$ therewith, the bearing body E being the base structure adapted to mount the combination and attach it to a support for selective control through actuation of means F.

The bearing body E which is the base of the structural combination can be mounted upon a static support 10 as is preferred. However, it is possible to incorporate the driven element B and bearing body E in cases where it is advantageous to dynamically mount the idler combination upon the shaft which is to be driveably connected. However, the preferred embodiment involves the independent construction of the bearing body E upon which the remaining structure is concentrically journaled, and whereby both drive element A and driven element B are free to rotate independently of each other. As shown, the bearing body E is in the nature of a tubular spindle which journals the driven element B and which houses the actuating parts of the control means F, later described. Thus, bearing body E is an axially elongated part having a mounting flange 11 with an inwardly projecting cylindrical journal 12 and with an outwardly projecting mounting stub 13. The stud 13 projects from a polygonal shoulder at the flange 11 and the body has a uniform bore 14 extending coextensively therethrough to open at its inner and outer ends 15 and 16. The inner end 15 is shouldered and externally threaded to receive a retainer nut and bearing washer 17, for disassembly and so that the driven element B will rotate freely between the axial confines of the flange 11 and said bearing washer 17. As illustrated, the mounting stud 13 is held to the support 10 as by means of a nut and locknut 18 and is secured from turning by means of said polygonal shoulder (see FIG. 3).

In accordance with the invention the clutch plates $C^1$ and $C^2$ are carried one from the other on the bearing body E and with the first mentioned clutch plate $C^1$ fixed to the driven element B. In the form shown herein the element B turns free on the body E, the said driven element B being a journaled element disposed between the said drive element A and bearing body E. That is, the driven element B is rotatable upon the journal 12 and in turn carries the plates $C^1$ and $C^2$ for engagement with the drive element A. As shown, an antifriction sleeve is disposed between parts E and B, and a characteristic feature is the concentric cylindrical race 20 of substantial diameter that establishes the hub of driven element B and upon which the drive element A revolves. The exposed outer end portion of the driven element B is formed into a sprocket 21, and an unobvious advantage of the large diameter race 20 is the provision of a large area next adjacent to the inner end of the structure and which cooperatively accommodates the pressure exerting means D and parts of the control means F. The efficiency of the means D is enhanced by the substantially large diameter and leaves an open central space for the accommodation of means F. Therefore, the cylindrical race 20 is defined by inner and outer sides 22 and 23, the former to mount the means D and the latter to mount the plate $C^1$ which thereby becomes integral therewith. The sides 22 and 23 are flat and parallel, side 22 being retained by the bearing washer 17 holding the sprocket 21 retained by the flange 11.

The pressure exerting means D involves drive posts 25 or equivalent members that project from the side 22 in a circumferential series. There is a plurality of posts 25, equally spaced and disposed in parallel relation.

As pointed out above, the clutch plate $C^1$ is drivably carried by the driven element B and is opposed by the clutch plate $C^2$. In practice, the active peripheral margins of the plates present raised disc portions that embrace the drive element A, a flat disclike element disposed therebetween and formed into a concentric sprocket 24. It is to be understood that the planes of the drive elements A and B are maintained substantially parallel and normal to the axis of the structural combination. In accordance with the invention, the clutch plate C² overlies the entire inner end of the structural combination and has drive openings 26 therethrough complementary with and slidably engaged over the drive posts 25. Thus, the clutch plates C¹ and C² drive together and are separable axially.

In accordance with the invention the drive element A is free to rotatably and axially float upon the race 20 and is the element which carries the frictional material required to achieve driving engagement when clamped between the clutch plates C¹ and C². As shown, a friction liner 30 is attached or bonded to the opposite sides 28 and 29 of the drive element A, the driving connection being effected by compression springs 31 captured beneath fasteners 32 threaded into the terminal ends of the posts 25. The springs 31 oppose the plate C² while the anchoring posts draw against the plate C¹ integral with the driven element B.

The drive element A is the sole element of the structural combination that is to continue revolvement when the clutch plates C¹ and C² are separated, and for efficient release from a normal secure driving engagement the drive element A has an inner race 33 formed therein to operate concentrically over the race 20. It is a feature of this invention to provide antifriction bearing engagement between the races 20 and 33 as by means of a sleeve, rollers, needles or balls. It is preferred that ball bearings 34 operate between the races 20 and 33, ball bearings of a diameter substantially equal to the thickness of the drive element A between the sides 28 and 29 thereof. In order to facilitate assembly and servicing, the ball bearings 34 are captured in assembly with the drive element A by means of inwardly disposed walls 35 that form a channel embracing said bearings while exposing them to engagement upon the race 20. In carrying out the invention, the walls 35 are conformed to the sides of the ball bearings 34 and are turned inwardly, as shown, so as to partially underlie said bearings with clearance, thereby exposing the inward peripheral portions thereof for engagement upon the race 20. It will be apparent that the drive element A is enabled thereby to revolve freely upon the driven element B and is free to shift axially thereupon for engagement and/or disengagement as controlled by the opposed action of the clutch elements C¹ and C².

The structural combination thus far described establishes a normally engaged clutch wherein driving connection is effected between the drive element A and the driven element B. The axial pressure exerted by springs 31 qualifies the clutch plate C² as a pressure plate, the clutch plate C¹ being rotatably fixed in an axial plane. The drive element A is driven from its periphery and floats axially upon the race 20 to seek engaged and disengaged positions. In practice, the opposing pressure of clutch plates C¹ and C² holds the drive element A in planar alignment normal to the rotational axis of the structural combination, and when said opposing pressure is relaxed or removed the clearance between the plates C¹ and C² and the drive element A therebetween is minimal and to the end that said alignment is maintained. When the drive element A is free of the clutch plates C¹ and C² it is released from the drive element B and rotates on race 20, in which condition the element B idles on the bearing body E.

The foregoing disengagement is a result of the actuation effected by the control means F which operates centrally upon the opposed clutch plate C² through the bore 14 in the bearing body E. In accordance with the invention, the control means F is manually or otherwise operated and involves a reciprocal action characterized by a throwout element 40 preferably in the form of a pin that is exposed at one end of the bearing body E. In practice the element 40 projects from the stud 13 and the throwout element is depressible relative to the bearing body E to move the plate C² and thereby separate it from the plate C¹. As shown, the throwout element 40 bears upon the opposed center of plate C² where it is held concentric within a recess 41 by the bore 14 in the bearing body E. In carrying out the preferred form of the invention a throwout bearing is provided and which can take various forms, a most simple and practical form being shown wherein the throwout element 40 is sectional, having a headed portion 42 centered in the recess 41 and a rod portion 43 slideably in the bore 14. The portion 42 and 43 have opposed bearing faces 44 and 45 normal to the axis of rotation and between which a ball bearing 46 is carried for pivotal antifriction engagement. Thus, when the rod portion 43 is forcibly shifted inwardly (into the bearing body E from the stud 13 end thereof) and without rotation, the normally rotating head portion 42 is shifted axially against the pressure of the multiplicity of springs 31. The ball bearing 46 isolates torque transfer between the sections until the driven element B and associate parts cease to rotate, to the end that the throwout bearing 46 operates but momentarily during each disengagement and/or engagement of the drive element A.

From the foregoing it will be observed that a very unique mode of operation is achieved wherein the throwout bearing 46 actively rotates but momentarily during engagement and/or disengagement of the clutch. Upon said disengagement the normally rotating driven element B and clutch plates C¹ and C² become idle and are permitted to come to rest while the drive element A continues to revolve on the race 20. Disengagement of the drive element A involves infinitesimal movement of the clutch plate C² with a corresponding axial shifting of the antifriction ball bearings on the race 20. The parts and elements are openly formed and with but few faces and bearing surfaces which require accurate finishing. That is, each part and element presents open access for preparation of the finished surfaces thereof and to the end that manufacture is simplified. As is clearly illustrated in the drawings, the clutch elements and sprockets are flat platelike elements that are easily formed, while the bearing body and hub portion of the drive element B are simple machined parts. In carrying out the invention, the sprocket 21 of the drive element B is swaged onto a polygonal hub portion, and the posts 25 of the pressure means D are riveted through said hub portion while fastening the clutch plate C¹ thereto. It will be seen that assembly and disassembly is a simple matter and that the drive element A is easily removable in order to expose the drive surfaces for relining when and if circumstances require. Any suitable push or pull means can be employed to depress the throwout element 40 in order to disengage and separate the drive elements A and B.

Having described only a typical preferred form and application of our invention, we do not wish to be limited or restricted to the specific details herein set forth, but wish to reserve to ourselves any modifications or variations that may appear to those skilled in the art.

Having described our invention, we claim:

1. A transmission idler and clutch comprising, a pair of opposed axially separable drive plates drivably carried by a hub journaled to rotate on a bearing body fixable to a support, a first disc-shaped drive element rotatably journaled on said hub and engageably disposed between said drive plates and with its periphery drivably exposed, a second drive element fixed on said hub and with its periphery drivably exposed, pressure-exerting means normally yieldingly urging said pair of separable drive plates into pressured engagement with the first disc-shaped drive element therebetween, and control means actuable to separate said pair of drive plates from said drive element therebetween and including an axially shiftable throwout element extending through and exposed at one end of the bearing body and actuably engageable with the one drive plate to move it from the other drive plate against said pressure-exerting means.

2. The transmission idler and clutch as set forth in claim 1 and wherein friction lining is carried between the engageable peripheral portions of the drive plates and first disc-shaped drive element disposed therebetween.

3. The transmission idler and clutch as set forth in claim 1, wherein the said hub has a cylindrical outer race thereon, and wherein the first disc-shaped drive element has a concentric inner race with an antifriction bearing confined between said races and movable both axially and circumferentially upon the first-mentioned race.

4. The transmission idler and clutch as set forth in claim 1, wherein the said hub has a cylindrical outer race thereon, and wherein the first disc-shaped drive element has a concentric inner race with ball bearings confined between the races therein and rolling both axially and circumferentially upon the first-mentioned race.

5. The transmission idler and clutch as set forth in claim 1, wherein the said hub has a cylindrical outer race thereon, and wherein the first disc-shaped drive element has a concentric inner race with rolling bearings confined between the races and shiftable axially upon the first-mentioned race, there being a retainer means partially embracing said rolling bearings with their inner and outer peripheries exposed and to roll on said cylindrical and concentric races respectively.

6. The transmission idler and clutch as set forth in claim 1, wherein the said hub has a cylindrical outer race thereon, and wherein the first disc-shaped drive element has a concentric inner race with ball bearings confined between the races and rolling both axially and circumferentially upon the first-mentioned race, there being a retainer carried by the disc-shaped drive element and partially embracing the said ball bearings with the inner peripheries exposed to roll on said cylindrical and concentric races respectively and to hold them in assembly with said disc-shaped element.

7. The transmission idler and clutch as set forth in claim 1 and wherein the throwout element of the control means engages the said one drive plate through an antifriction throwout bearing.

8. The transmission idler and clutch as set forth in claim 1 wherein the throwout element of the control means is sectional with one section bearing against the said opposed center of the one drive plate and with the other section exposed and reciprocably actuable, and wherein an antifriction bearing is operably interposed between the said sections.

9. A transmission idler and clutch comprising, a pair of opposed axially separable drive plates and one of which is drivably carried by a hub journaled to rotate on a bearing body fixable to a support, a first disc-shaped drive element rotatably journaled on said hub and engageably disposed between said drive plates and with its periphery driveably exposed, a second drive element fixed on said hub and with its periphery drivably exposed, pressure-exerting means normally yieldingly urging said pair of separable drive plates into pressured engagement with the drive element therebetween and including circumferentially spaced drive posts projecting from and parallel with the rotational axis of the said hub and slidable through complementary openings in the other drive plate and springs anchored to the drive posts and engaging said other drive plate to urge it toward said one drivably carried drive plate, and control means actuable to separate said pair of drive plates from said drive element therebetween and including an axially shiftable throwout element extending through and exposed at one end of the bearing body and actuably engageable with the said other drive plate to move it from the said one drive plate against said pressure-exerting means.

10. The transmission idler and clutch as set forth in claim 9 wherein the said hub has a cylindrical outer race thereon circumscribing the guide posts of said pressure-exerting means, and wherein the first disc-shaped drive element has a concentric inner race with an antifriction bearing confined between the races and movable both axially and circumferentially upon the first-mentioned race.

11. The transmission idler and clutch as set forth in claim 9 wherein the said hub has a cylindrical outer race thereon circumscribing the guide posts of said pressure-exerting means, and wherein the first disc-shaped drive element has a concentric inner race with ball bearings confined between the races and rolling both axially and circumferentially upon the first-mentioned race.

12. The transmission idler and clutch as set forth in claim 9 wherein the said hub has a cylindrical outer race thereon circumscribing the guide posts of said pressure-exerting means, and wherein the first disc-shaped drive element has a concentric inner race with rolling bearings confined between the races and shiftable axially upon the first-mentioned race, there being a retainer means partially embracing said rolling bearings with their inner and outer peripheries exposed and to roll on said cylindrical and concentric races respectively.

13. The transmission idler and clutch as set forth in claim 9 wherein the said hub has a cylindrical outer race thereon circumscribing the guide posts of said pressure-exerting means, and therein the first disc-shaped drive element has a concentric inner race with ball bearings confined between the races and rolling both axially and circumferentially upon the first-mentioned race, there being a retainer carried by the disc-shaped drive element and partially embracing the said ball bearings with the inner peripheries exposed to roll on said cylindrical and concentric races respectively and to hold them in assembly with said disc-shaped element.

14. The transmission idler and clutch as set forth in claim 9 and wherein the throwout element of the control means emanates from the bearing body centrally within the said guide posts and engages the said other drive plate through an antifriction throwout bearing.

15. The transmission idler and clutch as set forth in claim 9 and wherein the throwout element of the control means emanates from the bearing body centrally within the said guide posts and is sectional with one section bearing against the said opposed center of said other drive plate and with the other section exposed and reciprocably actuable, and wherein an antifriction bearing is operably interposed between the said sections.

* * * * *